(12) United States Patent
Ishii

(10) Patent No.: US 12,198,411 B2
(45) Date of Patent: Jan. 14, 2025

(54) LEARNING APPARATUS, LEARNING METHOD, AND RECORDING MEDIUM

(71) Applicant: NEC Corporation, Tokyo (JP)

(72) Inventor: Asuka Ishii, Tokyo (JP)

(73) Assignee: NEC CORPORATION, Tokyo (JP)

( * ) Notice: Subject to any disclaimer, the term of this patent is extended or adjusted under 35 U.S.C. 154(b) by 358 days.

(21) Appl. No.: 17/772,622

(22) PCT Filed: Nov. 13, 2019

(86) PCT No.: PCT/JP2019/044596
§ 371 (c)(1),
(2) Date: Apr. 28, 2022

(87) PCT Pub. No.: WO2021/095176
PCT Pub. Date: May 20, 2021

(65) Prior Publication Data
US 2022/0366678 A1    Nov. 17, 2022

(51) Int. Cl.
*G06V 10/82*    (2022.01)
*G06T 7/73*    (2017.01)
*G06V 10/764*    (2022.01)
*G06V 10/77*    (2022.01)
(Continued)

(52) U.S. Cl.
CPC .............. *G06V 10/776* (2022.01); *G06T 7/73* (2017.01); *G06V 10/764* (2022.01); *G06V 10/7715* (2022.01); *G06V 10/7792* (2022.01); *G06T 2207/20081* (2013.01); *G06V 10/82* (2022.01); *G06V 2201/07* (2022.01)

(58) Field of Classification Search
CPC .... G06T 7/73; G06V 10/776; G06V 10/7715; G06V 10/7792; G06V 10/764
See application file for complete search history.

(56) References Cited

U.S. PATENT DOCUMENTS

2018/0268292 A1    9/2018   Choi et al.
2019/0385086 A1   12/2019   Wang et al.

FOREIGN PATENT DOCUMENTS

JP    2019-053569 A    4/2019
JP    2019-215861 A   12/2019

OTHER PUBLICATIONS

International Search Report for PCT Application No. PCT/JP2019/044596, mailed on Feb. 18, 2020.
(Continued)

*Primary Examiner* — Sam Bhattacharya
(74) *Attorney, Agent, or Firm* — Sughrue Mion, PLLC

(57) ABSTRACT

Teacher and student models output inference results for training data. A loss calculation unit calculates a total loss using at least one of (1) a loss obtained by multiplying a difference between a true value and a student model output by a weight increasing as a confidence of the teacher model output is lower, (2) a loss obtained by multiplying a difference between the true value and the student model output by a weight increasing as a difference between the true value and the teacher model output is greater, and (3) a loss obtained by multiplying a difference between the teacher and student model outputs by weights increasing as the difference between the teacher and student model outputs is greater and increasing as the difference between the true value and the teacher model output is smaller. An update part updates parameters of the student model based on the total loss.

8 Claims, 11 Drawing Sheets

(51) Int. Cl.
*G06V 10/776* (2022.01)
*G06V 10/778* (2022.01)

(56) References Cited

OTHER PUBLICATIONS

Lin et al., "Focal Loss for Dense Object Detection", arXiv:1708. 02002v2 [cs.CV] Feb. 7, 2018, pp. 1-10.
Tang et al., "Learning Efficient Detector with Semi-supervised Adaptive Distillation", arXiv: 1901.00366v2 [cs.CV] Jan. 14, 2019, pp. 1-9.
Wang et al., "Discover the Effective Strategy for Face Recognition Model Compression by Improved Knowledge Distillation", 2018 25th IEEE, ICIP, pp. 2416-2420.
Fujiyoshi et al., "Image Recognition by Deep Learning", Journal of the Robotics Society of Japan, Apr. 2017, vol. 35, No. 3, pp. 180-185.

FIG. 1
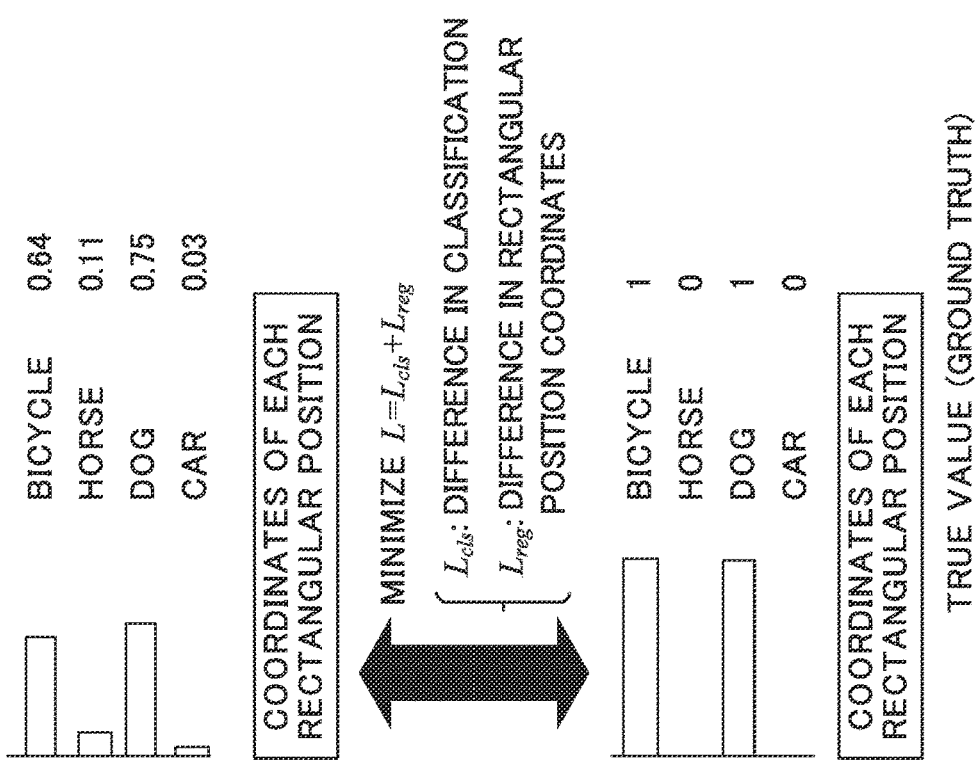
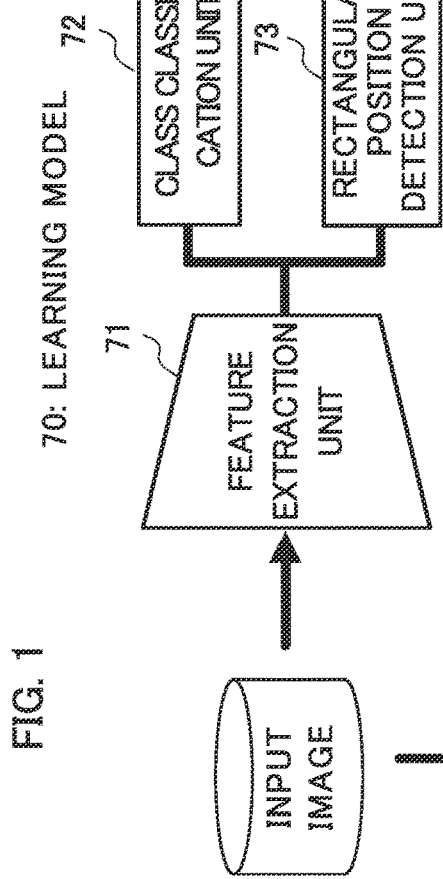

LEARNING APPARATUS, LEARNING METHOD, AND RECORDING MEDIUM

This application is a National Stage Entry of PCT/JP2019/044596 filed on Nov. 13, 2019, the contents of all of which are incorporated herein by reference, in their entirety.

TECHNICAL FIELD

The present some non-limiting embodiments relate to an object detection.

BACKGROUND ART

In recent years, many object detection techniques using neural networks using deep learning have been proposed. An object detection is to estimate what an object is in an image or a video and at the same time calculate a position of a rectangle circumscribing the object, so as to estimate the position and a size of the object. An object detector outputs a rectangular position of the object and a degree of reliability indicating a probability that the object is in each class.

Non-Patent Document 1 describes a method for defining anchors on a feature map obtained by a feature extraction from an original image and performing learning with an emphasis on a notable anchor. Moreover, Non-Patent Document 2 describes a method for training a student model by using a technique called distillation and using an output of a trained teacher model.

PRECEDING TECHNICAL REFERENCES

Patent Document

Non-Patent Document 1: Tsung-Yi Lin, Priya Goyal, Ross Girshick, Kaiming He, Piotr Dollar, "Focal Loss for Dense Object Detection,", arXiv: 1708.02002v2, 2018
Non-Patent Document 2: Shitao Tang, Litong Feng, Wenqi Shao, Zhanghui Kuang, Wei Zhang, Yimin Chen, "Learning Efficient Detector with Semi-supervised Adaptive Distillation", arXiv: 1901.00366v2, 2019

SUMMARY

Problem to be Solved

A method of Non-Patent Document 2 mainly learns a student model according to the following policies.
  For an anchor with lesser confident teacher model, a difference in output between the teacher model and the student model is smaller.
  For an anchor with a greater difference in output between the teacher model and the student model, difference in output between the teacher model and the student model is smaller.
  However, according to the above policies, in a case where the teacher model is low accurate, learning may be performed in a wrong direction. That is, in the first policy, for the anchor with lesser confident teacher model, the student model is trained to output with less confident. In the second policy, in a case where an output of the teacher model is incorrect, even if the student model answers correctly, the student model may re-learn an incorrect answer.

It is one object of the present disclosure to provide a learning method capable of correctly learning without being adversely affected due to the teacher model even if accuracy of the teacher model is not particularly high.

Means for Solving the Problem

According to an example aspect of the present disclosure, there is provided a learning apparatus including:
  a teacher model configured to output an inference result with respect to training data;
  a student model configured to output an inference result with respect to the training data;
  a loss calculation unit configured to calculate a total loss based on an output of the teacher model, an output of the student model, and a true value with respect to the training data; and
  an update unit configured to update parameters of the student model based on the total loss,
  wherein the loss calculation unit calculates the total loss using at least one of
  (1) a first loss obtained by multiplying a difference between the true value and the output of the student model by a first weight that increases as a level of confidence of the output of the teacher model is lower,
  (2) a second loss obtained by multiplying a difference between the true value and the output of the student model by a second weight that increases as a difference between the true value and the output of the teacher model is greater, and
  (3) a third loss obtained by multiplying a difference between the output of the teacher model and the output of the student model by a third weight that increases as the difference between the output of the teacher model and the output of the student model is greater and a fourth weight that increases as the difference between the output of the teacher model and the output of the student model is smaller.

According to another example aspect, there is provided a learning method, including:
  outputting an inference result with respect to training data by the teacher model;
  outputting an inference result with respect to the training data by the student model;
  calculating a total loss based on an output of the teacher model, an output of the student model, and a true value with respect to the training data by using at least one of
  (1) a first loss obtained by multiplying a difference between the true value and the output of the student model by a first weight that increases as a level of confidence of the output of the teacher model is lower,
  (2) a second loss obtained by multiplying a difference between the true value and the output of the student model by a second weight that increases as a difference between the true value and the output of the teacher model is greater, and
  (3) a third loss obtained by multiplying a difference between the output of the teacher model and the output of the student model by a third weight that increases as the difference between the output of the teacher model and the output of the student model is greater and a fourth weight that increases as the difference between the output of the teacher model and the output of the student model is smaller.

According to a further example aspect, there is provided a recording medium storing a program, the program causing a computer to perform a process including:
  outputting an inference result with respect to training data by the teacher model;

outputting an inference result with respect to the training data by the student model;

calculating a total loss based on an output of the teacher model, an output of the student model, and a true value with respect to the training data by using at least one of
(1) a first loss obtained by multiplying a difference between the true value and the output of the student model by a first weight that increases as a level of confidence of the output of the teacher model is lower,
(2) a second loss obtained by multiplying a difference between the true value and the output of the student model by a second weight that increases as a difference between the true value and the output of the teacher model is greater, and
(3) a third loss obtained by multiplying a difference between the output of the teacher model and the output of the student model by a third weight that increases as the difference between the output of the teacher model and the output of the student model is greater and a fourth weight that increases as the difference between the output of the teacher model and the output of the student model is smaller.

Effect

According to the present disclosure, it is possible to perform correct learning without being adversely affected due to a teacher model, even if accuracy of the teacher model is not particularly high.

BRIEF DESCRIPTION OF THE DRAWINGS

FIG. 1 illustrates a basic configuration example of an object detection model using a neural network.

EXAMPLE EMBODIMENTS

Figure 2:
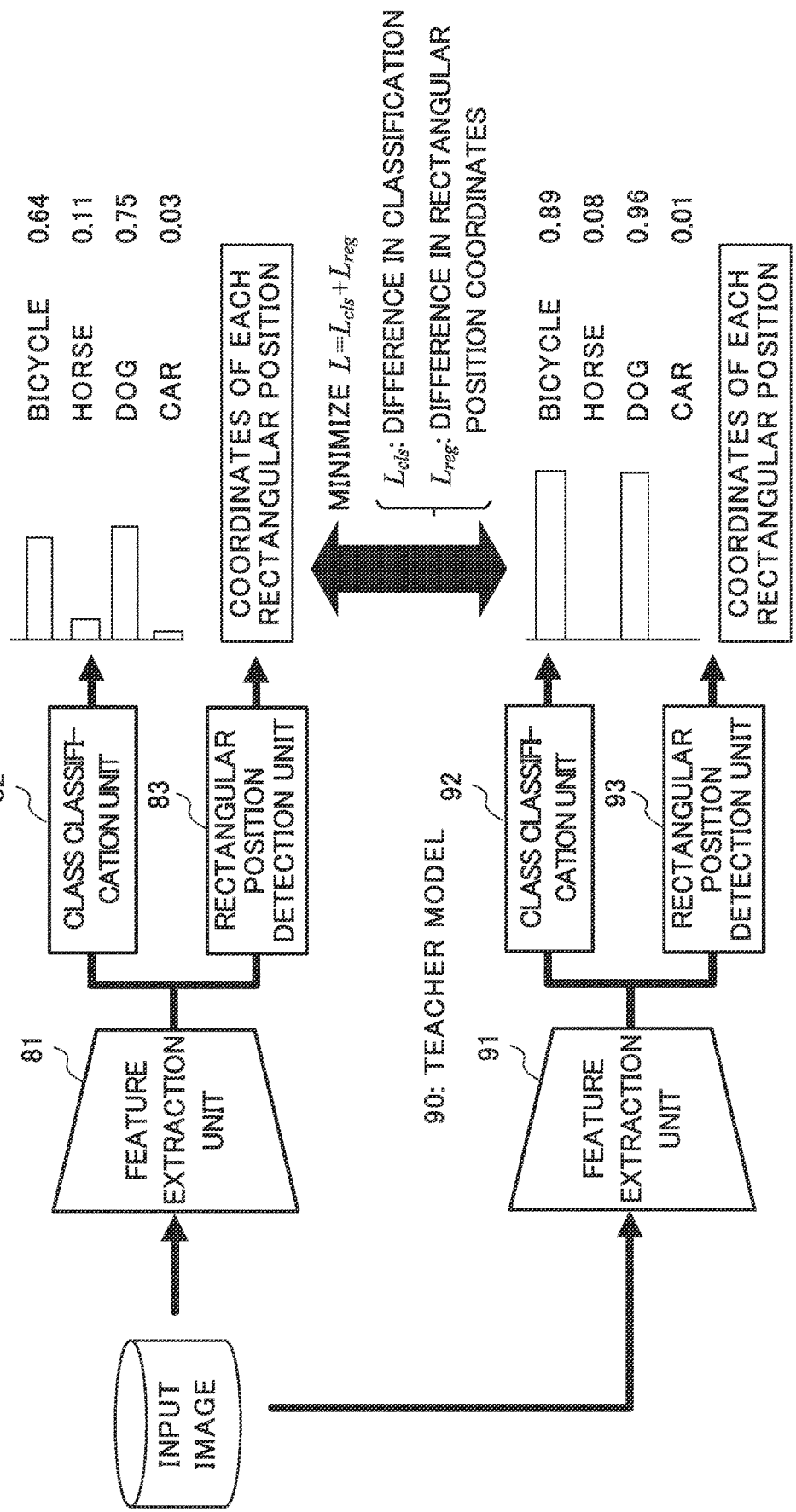
FIG. 2 illustrates an object detection model using a distillation.

In the following, example embodiments will be described with reference to the accompanying drawings.
<Basic Configuration of Object Detection Model>

FIG. 1 illustrates an example of a basic configuration of an object detection model using a neural network. An example in FIG. 1 is a network called "RetinaNet", but the present disclosure can also be applied to networks such as a "SSD", a "YOLO", and a "Faster RCNN". A learning model 70 includes a feature extraction unit 71, a class classification unit 72, and a rectangular position detection unit 73. The feature extraction unit 71 extracts features from an input image by a CNN (Convolutional Neural Network) or the like, and generates a feature map. The class classification unit 72 performs a class classification with respect to detection targets based on the feature map, and outputs a classification result. In the example in FIG. 1, the detection targets are four classes of a "bicycle", a "horse", a "dog", and a "car", and the class classification unit 72 outputs a degree of reliability (a probability) for each class as the classification result. Moreover, the rectangular position detection unit 73 outputs coordinates of a rectangular position circumscribing each detection target based on the feature map.

Correct answer data (also referred to as a true value ("ground truth")) are prepared in advance for the input image. A difference Lcls in class classification (hereinafter, also referred to as a "classification loss", and a "loss" is also referred to as a "loss") is calculated based on a class classification result by the class classification unit 72 and the correct answer data of the class classification. Moreover, a difference (hereinafter, also referred to as a "regression loss") Lreg between coordinates of the rectangular position detected by the rectangular position detection unit 73 and the correct answer data at the coordinates of the rectangular position is calculated. Note that, the difference between the coordinates of the rectangular position and the correct answer data at the coordinates of the rectangular position can be calculated by a method other than regression; however, in the present example embodiment, it is calculated by regression and is called a "regression loss". Accordingly, the learning model is trained so as to minimize a sum (also referred to as a "total loss") L of the classification loss Lcls and the regression loss Lreg shown below.

[Math 1]

$$L = L_{cls} + L_{reg} \quad (1)$$

<Learning of Class Classifier>

Next, learning of a class classifier will be described.
[Focal Loss]

First, a method called a "Focal Loss (hereinafter, also referred to as "FL")" will be described. RetinaNet illustrated in FIG. 1 is a method for embedding an "anchor" having a spread for each pixel on the feature map extracted by the feature extraction unit 71, performing the class classification for each anchor, and detecting a rectangular position for each anchor. In particular, the focal loss focuses on a notable anchor among a plurality of anchors included in the feature map for learning. For instance, among a plurality of anchors set on the feature map, anchors that are expected to presence of detection targets are focused on, rather than anchors that correspond to a background. Specifically, a degree of attention is higher with respect to an anchor that is difficult to predict by DNN (Deep Neural Network), that is, an anchor with a greater difference between a correct answer and a prediction. The focal loss FL(p) is expressed by the following equation. Note that "a" is a constant determined based on a class balance of training data.

[Math 2]

$$FL(p) = \begin{cases} -\alpha(1-p)^\gamma \log[p] & (y=1) \\ -(1-\alpha)p^\gamma \log[1-p] & (y=0) \end{cases} \quad (2)$$
$$= \exp[-KL(y\|\alpha)](1-\exp[-KL(y\|p)])^\gamma KL(y\|p)$$

For instance, for anchors that include a dog and a bicycle as detection targets, an expression for a correct answer class is used for the "dog" and the "bicycle", and an expression for an incorrect answer class is used for other cases. Then, FL(p) is used instead of Lcls as the classification loss in the above equation (1), and a model is trained using the following total loss L.

[Math 3]

$$L = FL(p) + L_{reg} \quad (3)$$

[Distillation]

Next, a technique called distillation (Knowledge Distillation) will be described. The distillation is a method for training a student model using an output of a teacher model that has already been trained. FIG. 2 illustrates an object detection model using the distillation. A student model 80 is a model to be trained, and includes a feature extraction unit 81, a class classification unit 82, and a rectangular position detection unit 83. The feature extraction unit 81 generates a feature map from the input image. The class classification unit 82 outputs a class classification result for detection targets based on the feature map. Moreover, the rectangular position detection unit 83 outputs the coordinates of the rectangular position to be detected based on the feature map.

On the other hand, the teacher model 90 is a model that has been trained in advance using a large number of images, and includes a feature extraction unit 91, a class classification unit 92, and a rectangular position detection unit 93. The input image is also input to the teacher model 90. In the teacher model 90, the feature extraction unit 91 generates a feature map from the input image. The class classification unit 92 outputs a class classification result for detection targets based on the feature map. Moreover, the rectangular position detection unit 93 outputs coordinates of each rectangular position to be detected based on the feature map.

A difference between the class classification result output by the student model 80 and the class classification result output by the teacher model 90 is calculated as a classification loss Lcls, and a difference between the coordinates of each rectangular positions output by the student model 80 and the coordinates of each rectangular position output by the teacher model 90 is calculated as a regression loss Lreg. As the regression loss Lreg, a difference between the coordinates for each rectangular positions output by the student model 80 and a true value may be used. Then, the student model 80 is trained so that the total loss L represented by the above equation (1) is minimized.

[ADL]

Next, an ADL (Adaptive Distillation knowledge Loss) will be described. The ADL is a learning method that applies an idea of the focal loss to the distillation, and a model is trained according to the following policies.

With respect to anchors with a greater difference between an output of the teacher model and an output of the student model, the difference in output between the teacher model and the student model is reduced.

With respect to anchors with the teacher model having a less confident, the difference in output between the teacher model and the student model is reduced.

From the above policies, ADL is expressed by the following equation.

[Math 4]

$$ADL = (1 - \exp[-KL(q\|p) - \beta T(q)])^\gamma KL(q\|p) \quad (4)$$

The "Q" denotes an output of the teacher model, and the "p" denotes an output of the student model.

The "KL" denotes a KL Divergence and is also likened to a "KL distance" or simply a "distance". The KL(q∥p) denotes a function that measures a closeness between values of q and p, and takes a minimum value "0" when q=p.

The "T" denotes an entropy function and is given by T(q)=−q log[q]. The T(q) denotes an upwardly convex function, which is maximum when q=0.5 and minimum when q=0, 1. When q=0, 1, this indicates that the teacher model has a high degree of confidence in a class classification result. On the other hand, when q=0.5, this indicates that the teacher model is not confident because the class classification result of the teacher model represents unsure. Therefore, a confidence level of the output of the teacher model can be measured by T(q).

"B" and "γ" are hyperparameters.

In addition, the following policy for an anchor is obtained by combining the focal loss method and the ADL method.

With respect to anchors in which the student model is incorrect, the difference in output between the true value and the student model is reduced.

The following equation is used for the total loss in this case.

[Math 5]

$$L = FL + ADL + L_{reg} \quad (5)$$

From the above, the following policies are obtained.

(A) With respect to anchors in which the student model is incorrect, the difference in output between the true value and the student model is reduced.

(B) With respect to anchors in which the teacher model is less confident (outputs 0.5), the difference in output between the teacher model and the student model is reduced.

(C) With respect to anchors in which the difference in output between the teacher model and the student model is greater, the difference in output between the teacher model and the student model is reduced.

However, according to the policies (B) and (C), when accuracy of the teacher model is low, learning may be performed in a wrong direction. That is, in the policy (B), for anchors in which the teacher model is less confident, the student model may be trained to produce an unconfident output. Also, in the policy (C), in a case where an output of the teacher model is incorrect, even if the student model answers correctly, the student model may re-learn an incorrect answer.

First Example Embodiment

[Basic Principle]

From the above viewpoint, the following policies (1) to (4) are considered in this example embodiment.

(1) With respect to anchors in which the difference in output between the teacher model and the student model is greater, the difference in output between the teacher model and the student model is reduced. This is the same as the above policy (C). Assuming that a loss between the teacher model and the student model obtained by this policy is denoted by an "L1", the L1 is obtained by the following equation. In addition, a "$\gamma_1$" denotes a hyperparameter.

[Math 6]

$$L1 = (1-\exp[-KL(q\|p)])^{\gamma 1} KL(q\|p) \qquad (6)$$

(2) With respect to anchors in which the teacher model is less confident, the difference in output between the true value and the student model is reduced. By this poliby, the problem of the above policy (B) can be solved. Assuming that the loss between the teacher model and the student model obtained by this policy is denoted by an "L2", the L2 is obtained by the following equation. In addition, a "$\gamma_2$" denotes a hyperparameter.

[Math 7]

$$L2 = (1-\exp[-T(q)])^{\gamma 2} KL(y\|p) \qquad (7)$$

(3) With respect to anchors in which the difference between a true value and an output of the teacher model is greater, the difference between the true value and an output of the student model is reduced. Assuming that the loss of the teacher model and the student model obtained by this policy is denoted by an "L3", the L3 is obtained by the following equation. In addition, a "$\gamma_2$" denotes a hyperparameter.

[Math 8]

$$L3 = (1-\exp[-KL(y\|q)])^{\gamma 2} KL(y\|p) \qquad (8)$$

(4) With respect to anchors in which the difference in output between the teacher model and the student model is greater and the difference between the true value and the output of the teacher model is smaller, the difference between the outputs of the teacher model and the student model is reduced. By this policy (4), the problem of the above policy (C) is solved. Assuming that a loss between the teacher model and the student model obtained by this policy is denoted by an "L4", the L4 is obtained by the following equation. In addition, a "$\gamma_1$" denotes a hyperparameter.

[Math 9]

$$L4 = \exp[-KL(y\|q)](1-\exp[-KL(q\|p)])^{\gamma 1} KL(q\|p) \qquad (9)$$

Here, since the loss L4 solves the problem of the policy (C), it is desirable to use the loss L4 instead of the above loss L1. Therefore, in the present example embodiment, at least one of the above losses L2 through L4, that is, any one loss or a combination of two or more from among the losses is defined as "myADL", and the model is trained so that the following total loss L is reduced.

[Math 10]

$$L = FL + myADL + L_{reg} \qquad (10)$$

According to the above-mentioned policies (B) and (C), it is possible to solve the problem that learning is performed in the wrong direction in a case where the accuracy of the teacher model is low.

From the above description, according to the present example embodiment, it is possible to improve the accuracy of the student model without using the teacher model with particularly high accuracy. Moreover, since the student model is trained with the output of the teacher model as a goal, a convergence of the learning can be accelerated as compared with a case where the output of the student model is brought closer to the true value. In other words, it is possible to obtain sufficient recognition accuracy even with a small amount of training data. In the above description, the losses L1 to L4 are mentioned, but in the present disclosure, the loss L1 may not be used, and at least one of the losses L2 to L4 may be used.

First Example

Next, a first example of the first embodiment will be described. In the first embodiment, from among the above losses L1 to L4, the losses L1 and L2 are used.

(Hardware Configuration)

Figure 3:
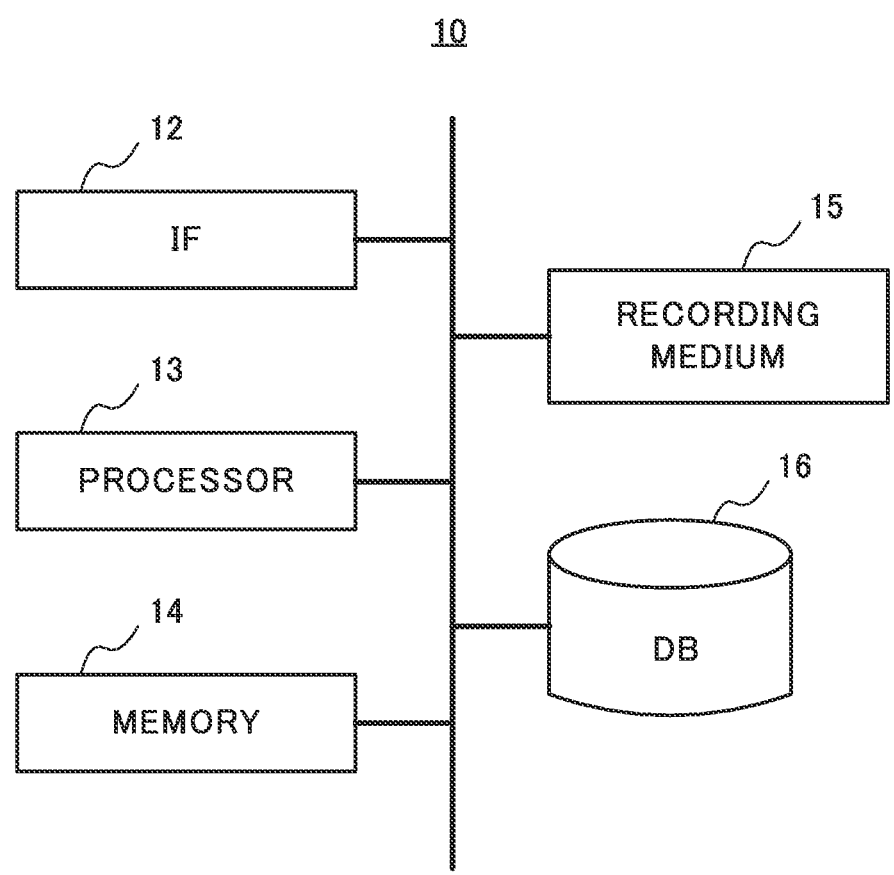
FIG. 3 illustrates a hardware configuration of an object detection apparatus according to a first example.

FIG. 3 is a block diagram illustrating a hardware configuration of an object detection apparatus according to the first example. As illustrated, the object detection apparatus 100 includes an input interface (IF) 12, a processor 13, a memory 14, a recording medium 15, and a database (DB) 16.

The input IF 12 is an interface for inputting data necessary for an object detection from an outside. Specifically, training data used by the object detection apparatus 100 during learning, image data used for an actual object detection process after learning, and the like are input via the input IF 12.

The processor 13 is a computer such as a CPU (Central Processing Unit), a GPU (Graphics Processing Unit), or the like, and controls the entire object detection apparatus 100 by executing a program prepared in advance. Specifically, the processor 13 trains an object detection model described later.

The memory 14 is formed by a ROM (Read Only Memory), a RAM (Random Access Memory), and the like. The memory 14 stores various programs executed by the processor 13. The memory 14 is also used as a working memory during executions of various processes by the processor 13.

The recording medium 15 is a non-volatile and non-transitory recording medium such as a disk-shaped recording medium or a semiconductor memory, and is formed to be removable from the object detection apparatus 100. The recording medium 15 records various programs executed by the processor 13. When the object detection apparatus 100 executes various processes, the program recorded on the recording medium 15 is loaded into the memory 14 and executed by the processor 13.

The database 16 stores image data and the like input from an external device through the input IF 12. Specifically, image data used for learning of the object detection apparatus 100 are stored. In addition to the above, the object detection apparatus 100 may include an input device such as a keyboard, a mouse, or the like for a user to perform instructions and inputs, and a display device for presenting the object detection result to the user.

(Functional Configuration)

Figure 4:
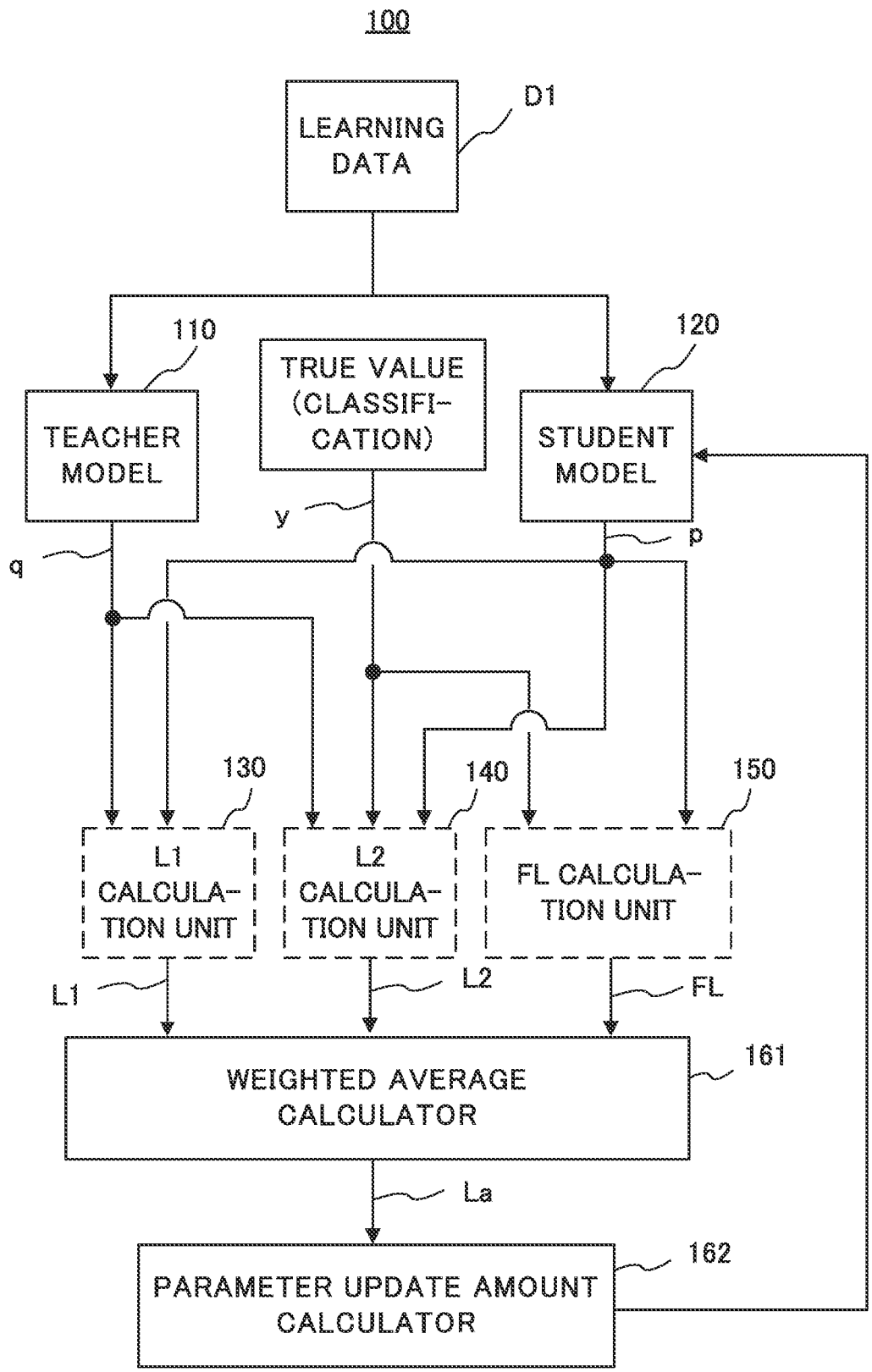
FIG. 4 illustrates a functional configuration concerning a class classification of the object detection apparatus according to the first example.

As described above, the object detection apparatus performs a class classification and a rectangular position detection, but for convenience of explanations, first, only a configuration related to the class classification will be described. FIG. 4 is a block diagram illustrating a functional configuration related to the class classification of the object detection apparatus 100 according to the first example. Note that FIG. 4 illustrates a configuration for learning by the object detection apparatus 100.

As illustrated, the object detection apparatus 100 includes a teacher model 110, a student model 120, an L1 calculation unit 130, an L2 calculation unit 140, an FL calculation unit 150, a weighted average calculator 161, and a parameter update amount calculation.

As data for learning, training data D1 and a true value y corresponding to the training data D1 are prepared. The training data D1 are image data including an image in which a detection target is captured. The true value y corresponds to data indicating a correct answer of the class classification with respect to the training data. The training data D1 are input to the teacher model 110 and the student model 120. Moreover, the true value y is input to the L2 calculation unit 140 and the FL calculation unit 150.

The teacher model 110 is a model that has already been trained using a large number of training data, detects an object from the training data D1, and inputs a class classification result (hereinafter, also referred to as a "teacher model output") q to the L1 calculation unit 130 and the L2 calculation unit 140. The student model 120 is a model to be trained, detects the object from the training data D1, and inputs a class classification result (hereinafter, also referred to as a "student model output") p to the L1 calculation unit 130, the L2 calculation unit 140, and the FL calculation unit 150.

Figure 5:
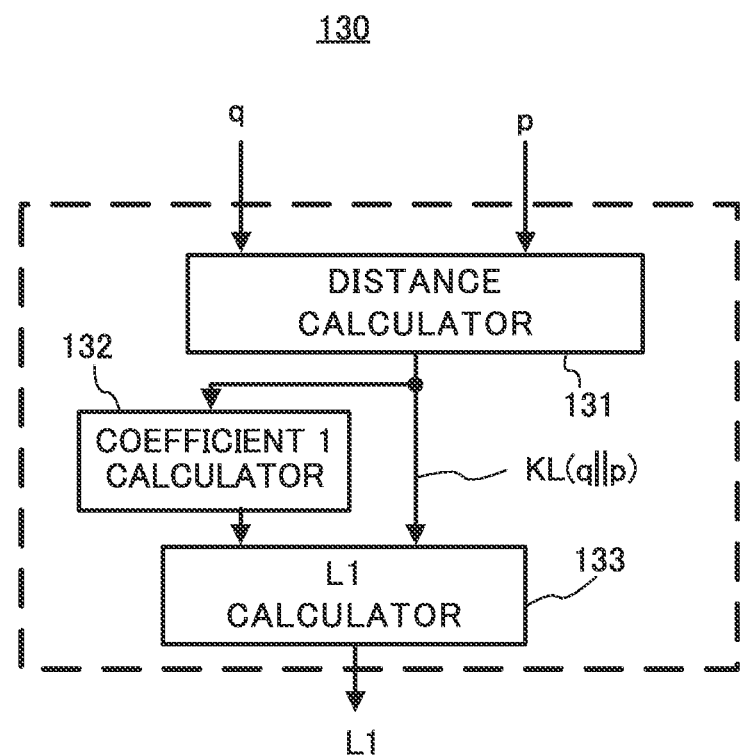
FIG. 5 illustrates a configuration of an L1 calculator.

The L1 calculation unit 130 calculates the above-described loss L1 by using the teacher model output q and the student model output p. FIG. 5 illustrates a configuration of the L1 calculation unit 130. The L1 calculation unit 130 includes a distance calculator 131, a coefficient 1 calculator 132, and an L1 calculator 133. The distance calculator 131 calculates a distance KL(q∥p) between the teacher model output q and the student model output p. The coefficient 1 calculator 132 calculates the following coefficient 1 based on the above equation (6).

[Math 11]

$$\text{Coefficient } 1 = (1 - \exp[-KL(q\|p)])^{\gamma_1} \quad (11)$$

Then, the L1 calculation unit 133 calculates the loss L1 by the equation (6) based on the coefficient 1 and the distance KL(q∥p).

Figure 6:
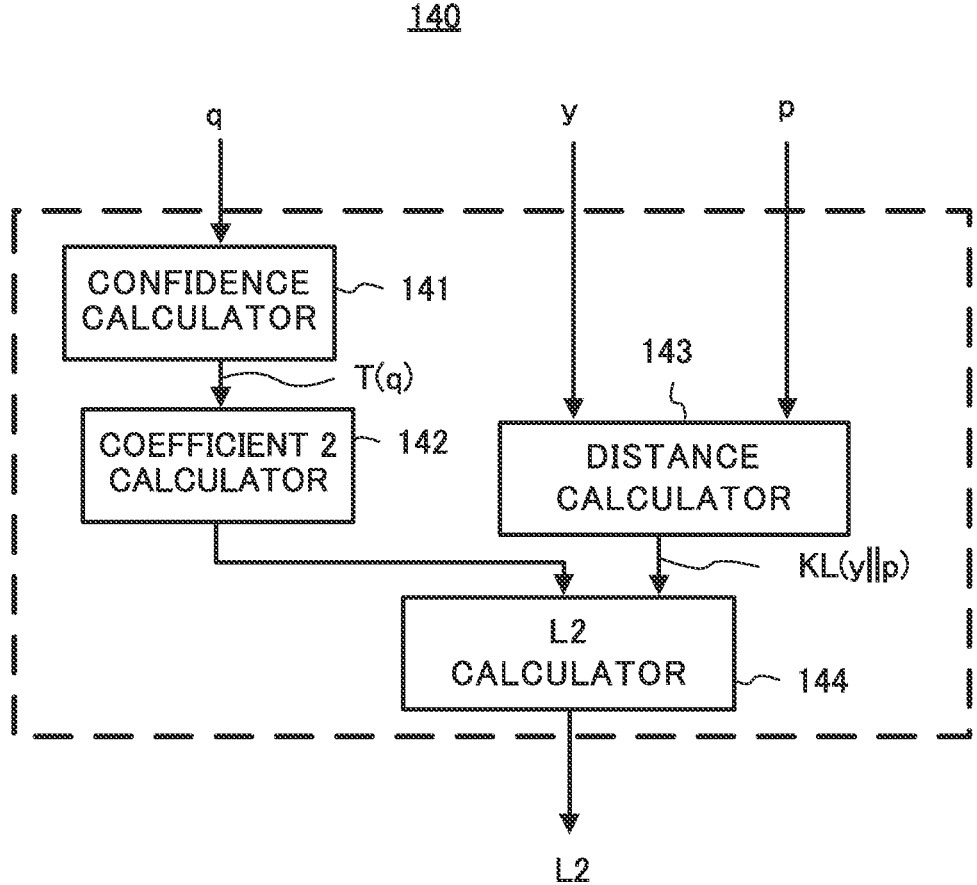
FIG. 6 illustrates a configuration of an L2 calculator.

The L2 calculation unit 140 calculates the loss L2 using the teacher model output q, the student model output p, and the true value y. FIG. 6 illustrates a configuration of the L2 calculation unit 140. The L2 calculation unit 140 includes a confidence calculator 141, a coefficient 2 calculator 142, a distance calculator 143, and an L2 calculator 144. The confidence calculator 141 calculates a confidence T(q) of the teacher model output q by using the above-described entropy function T. The coefficient 2 calculator 142 calculates the following coefficient 2 based on the above equation (7).

[Math 12]

$$\text{Coefficient } 2(1 - \exp[-T(q)])^{\gamma_2} \quad (12)$$

This coefficient 2 increases as the confidence T(q) of the teacher model output q decreases, and corresponds to a first weight.

On the other hand, the distance calculator 143 calculates a distance KL(y∥p) between the true value y and the student model output p. The L2 calculator 144 calculates the loss L1 by the equation (7) based on the coefficient 2 and the distance KL(y∥p).

Figure 7:
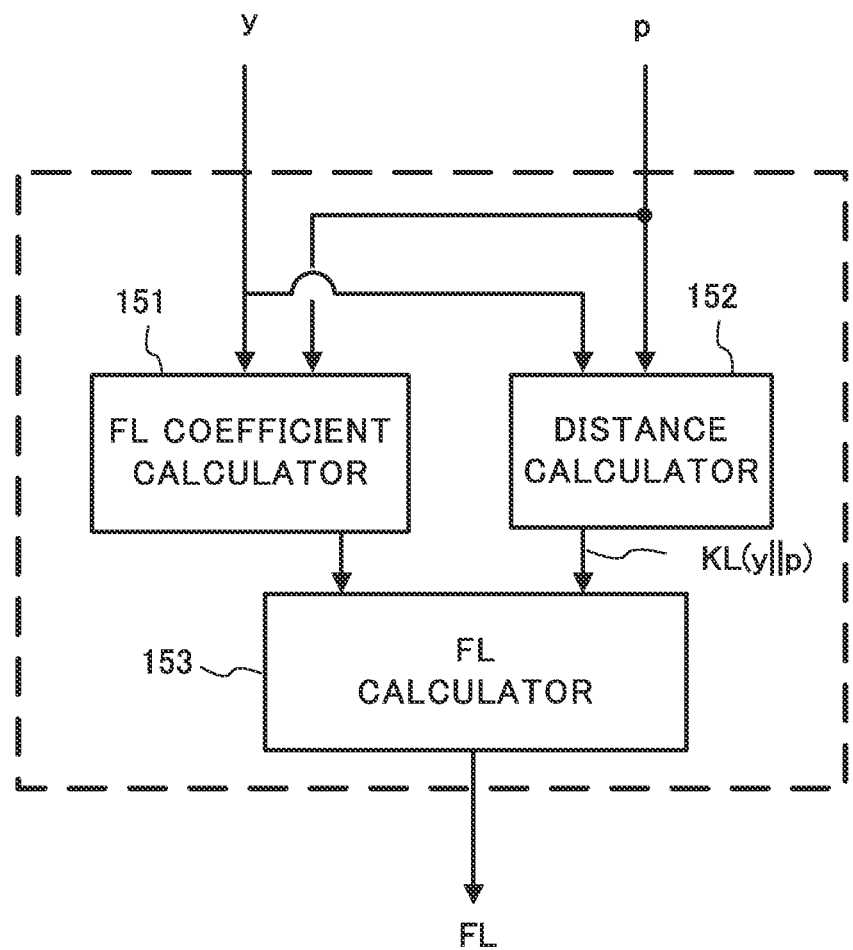
FIG. 7 illustrates a configuration of an FL calculator.

The FL calculation unit 150 calculates the above-described focal loss FL by using the true value y and the student model output p. FIG. 7 illustrates a configuration of the FL calculation unit 150. The FL calculation unit 150 includes an FL coefficient calculator 151, a distance calculator 152, and an FL calculator 153. The FL coefficient calculator 151 calculates the following FL coefficient based on the above equation (2) using the true value y and the student model output p.

[Math 13]

$$\text{FL coefficient} = -KL(y\|\alpha)(1 - \exp[-KL(y\|p)])^{\gamma} \quad (13)$$

Moreover, the distance calculator 152 calculates the distance KL(y∥p) between the true value y and the student model output p. Subsequently, the FL calculator 153 calculates the focal loss FL by the above equation (2) based on the FL coefficient and the distance KL(y∥p).

Returning to FIG. 4, the weighted average calculator 161 calculates a weighted average of the loss L1 output from the L1 calculation unit 130, and the loss L2 output from the L2 calculation unit 140, and the loss FL output from the FL calculation unit 150 by using predetermined weights, and inputs the weighted average as a loss La to the parameter update amount calculator 162. The parameter update amount calculator 162 updates parameters of the student model 120 so that the loss La is reduced. The object detection apparatus 100 trains the object detection model using a plurality of sets of training data D1 and the true values y thereof, and terminates the learning when a predetermined end condition is satisfied.

Figure 8:
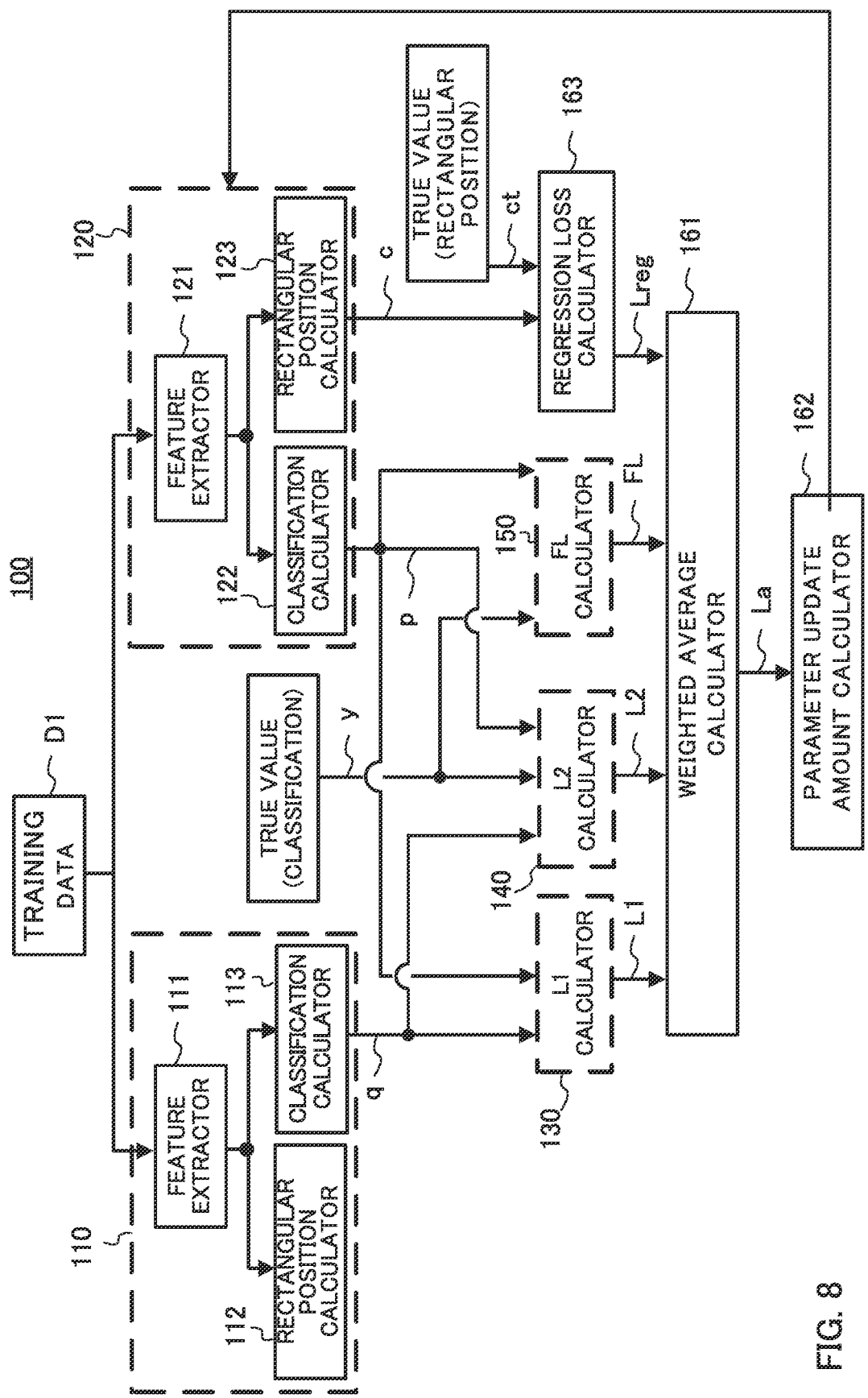
FIG. 8 illustrates an overall functional configuration of the object detection apparatus according to the first example.

Next, an overall configuration of the object detection apparatus 100 will be described. FIG. 8 illustrates the overall functional configuration of the object detection apparatus 100 according to the first example. The object detection apparatus 100 includes a regression loss calculator 163 in addition to a portion related to the classification illustrated in FIG. 4. Moreover, the teacher model 110 includes a feature extractor 111, a rectangular position calculator 112, and a classification calculator 113. Furthermore, the student model 120 includes a feature extractor 121, a classification calculator 122, and a rectangular position calculator 123.

In the teacher model 110, the feature extractor 111 performs a feature extraction on the training data D1 and inputs a feature map to the rectangular position calculator 112 and the classification calculator 113. In this example, the calculation result of the rectangular position calculator 112 is not used. The classification calculator 113 performs a class classification based on the feature map, and outputs a classification result q of the teacher model.

On the other hand, in the student model 120, the feature extractor 121 extracts features from the training data D1 and outputs a feature map to the class classification calculator 122 and the rectangular position calculator 123. The class classification calculator 122 performs a class classification based on the feature map, and outputs a class classification result p of the student model. The rectangular position calculator 123 calculates a rectangular position c based on the feature map and outputs the rectangular position c to the regression loss calculator 163. Since a true value ct of the rectangular position is input to the regression loss calculator 163, the regression loss calculator 163 calculates a difference between the rectangular position c and the true value ct as the regression loss Lreg and outputs the regression loss Lreg to the weighted average calculator 161.

The weighted average calculator 161 calculates a weighted average of the loss L1, the loss L2, the loss FL, and the regression loss Lreg by using predetermined weights, and inputs the weighted average as a loss La to the parameter update amount calculator 162. This loss La corresponds to the total loss L represented by the equation (10). The parameter update amount calculator 162 updates the parameters of the student model 120 so that the loss La is reduced. By these processes, the learning of the object detection model is performed.

Second Example

Next, a second example of the first embodiment will be described. In the second example, from among the above losses L1 to L4, the losses L3 and L4 are used.
(Hardware Configuration)

Since a hardware configuration of the object detection apparatus according to the second example is the same as that of the first example illustrated in FIG. 3, explanations thereof will be omitted.
(Functional Configuration)

Figure 9:
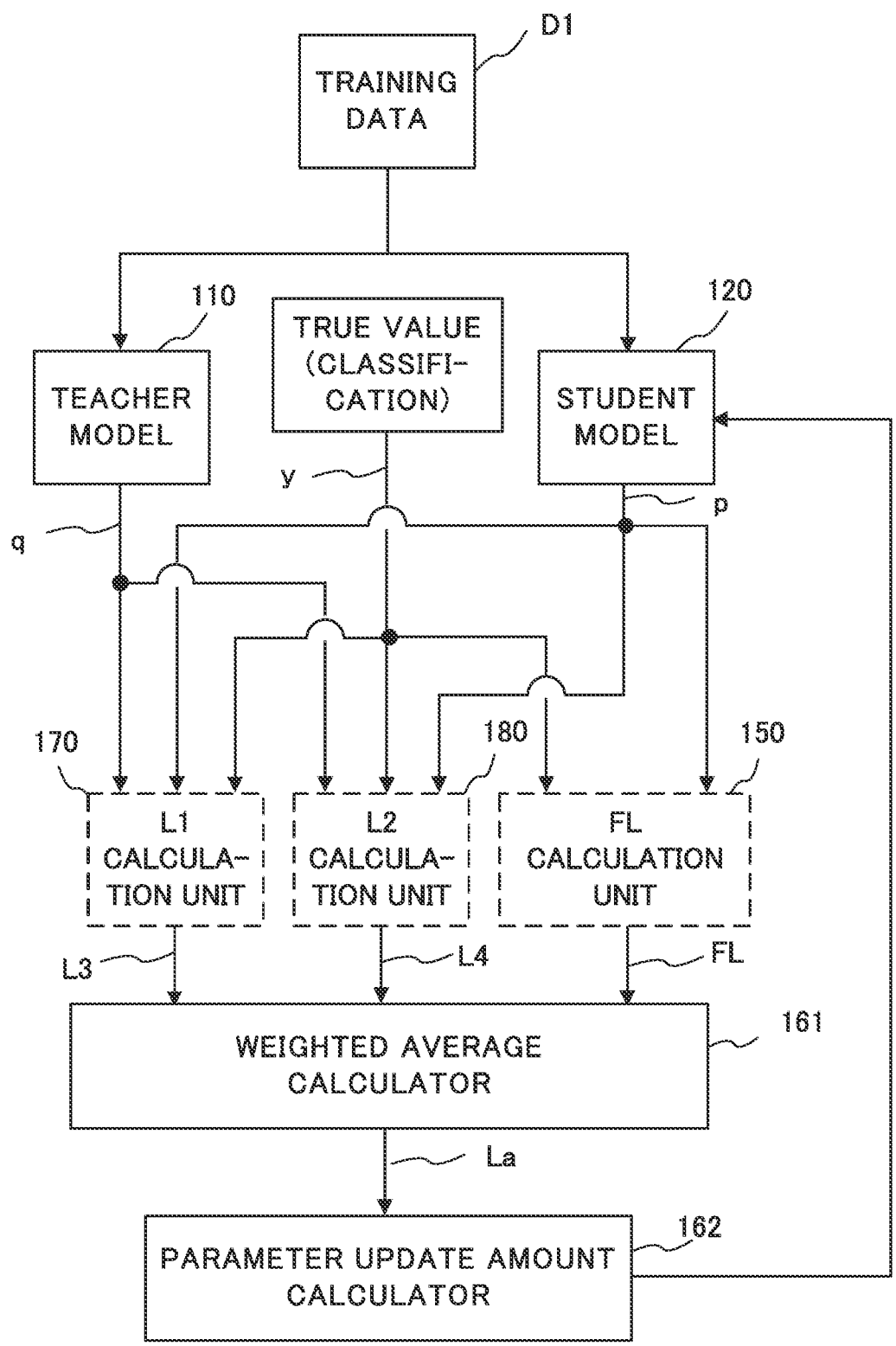
FIG. 9 illustrates a functional configuration concerning a class classification of an object detection apparatus according to a second example.

Also in the second example, first, only the configuration related to the classification will be described. FIG. 9 is a block diagram illustrating a functional configuration related to a class classification of an object detection apparatus 100x according to the second example. Note that FIG. 9 illustrates a configuration for learning in the object detection apparatus 100x.

As illustrated, the object detection apparatus 100x includes a teacher model 110, a student model 120, an FL calculation unit 150, a weighted average calculator 161, a parameter update amount calculator 162, an L3 calculation unit 170, and an L4 calculation unit 180. That is, the object detection apparatus 100x of the second example is provided with the L3 calculation unit 170 and the L4 calculation unit 180 in place of the L1 calculation unit 130 and the L2 calculation unit 140 in the object detection apparatus 100 of the first example, and other elements are the same as those of the object detection apparatus 100 in the first example.

Figure 10:
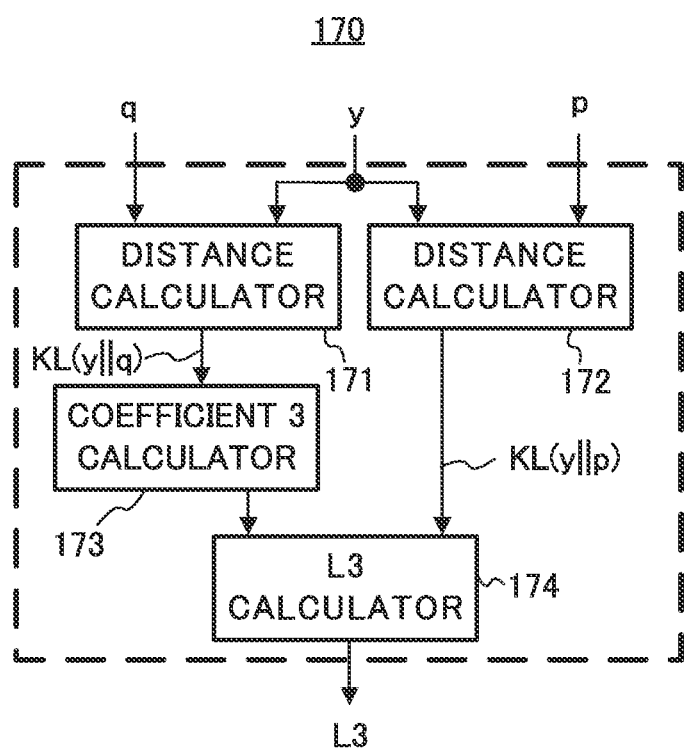
FIG. 10 illustrates a configuration of an L3 calculator.

The L3 calculation unit 170 calculates the above-described loss L3 by using the teacher model output q, the student model output p, and the true value y. FIG. 10 illustrates a configuration of the L3 calculation unit 170. The L3 calculation unit 170 includes distance calculators 171 and 172, a coefficient 3 calculator 173, and an L3 calculator 174. The distance calculator 171 calculates the distance $KL(y\|q)$ between the teacher model output q and the true value y. The distance calculator 172 calculates the distance $KL(y\|p)$ between the true value y and the student model output p. The coefficient 3 calculator 173 calculates the following coefficient 3 based on the above equation (8).

[Math 14]

$$\text{Coefficient } 3 = (1 - \exp[-KL(y\|q)])^{\gamma 2} \quad (14)$$

This coefficient 3 increases as a difference between the true value y and the teacher model output q increases, and corresponds to a second weight. The L3 calculator 174 calculates the loss L3 by the above equation (8) based on the coefficient 3 and the distance $KL(y\|p)$.

Figure 11:
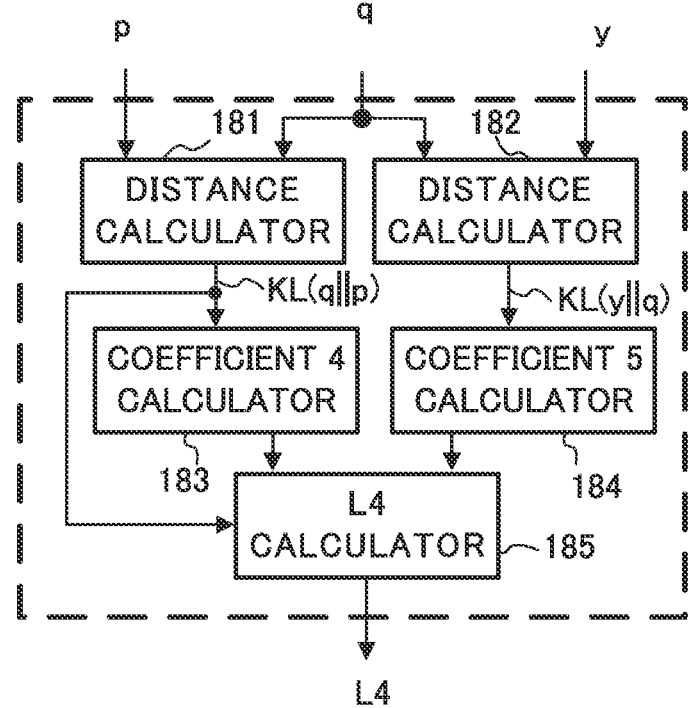
FIG. 11 illustrates a configuration of an L4 calculator.

The L4 calculation unit 180 calculates the above-described loss L4 by using the teacher model output q, the student model output p, and the true value y. FIG. 11 illustrates the configuration of the L4 calculation unit 180. The L4 calculation unit 180 includes distance calculators 181 and 182, a coefficient 4 calculator 183, a coefficient 5 calculator 184, and an L4 calculator 185. The distance calculator 181 calculates the distance $KL(q\|p)$ between the teacher model output q and the student model output p. The distance calculator 182 calculates the distance $KL(d\|p)$ between the true value y and the teacher model output q. The coefficient 4 calculator 183 calculates the following coefficient 4 based on the above equation (9).

[Math 15]

$$\text{Coefficient } 4 = (1 - \exp[-KL(y\|q)])^{\gamma 2} \quad (15)$$

This coefficient 4 increases as a difference between the teacher model output q and the student model output p increases, and corresponds to a third weight.

Also, the coefficient 5 calculator 184 calculates the following coefficient 5 based on the above equation (9).

[Math 16]

$$\text{Coefficient } 5 = [-KL(y\|q)] \quad (16)$$

This coefficient 5 becomes greater as a difference between the true value y and the teacher model output q becomes smaller, and corresponds to a fourth weight. The L4 calculator 185 calculates the loss L4 by the equation (9) based on the coefficient 4, the coefficient 5, and the distance $KL(d\|p)$.

Returning to FIG. 9, the weighted average calculator 161 calculates a weighted average of the loss L3 output from the L3 calculation unit 170, the loss L4 output from the L4 calculation unit 180, and the FL calculation unit 150 by using predetermined weights, and inputs weighted average as the loss La to the parameter update amount calculator 162. The parameter update amount calculator 162 updates the parameters of the student model 120 so that the loss La is reduced. The object detection apparatus 100 trains an object detection model using a plurality of sets of training data D1 and the true values y thereof, and terminates the learning when a predetermined end condition is satisfied.

Figure 12:
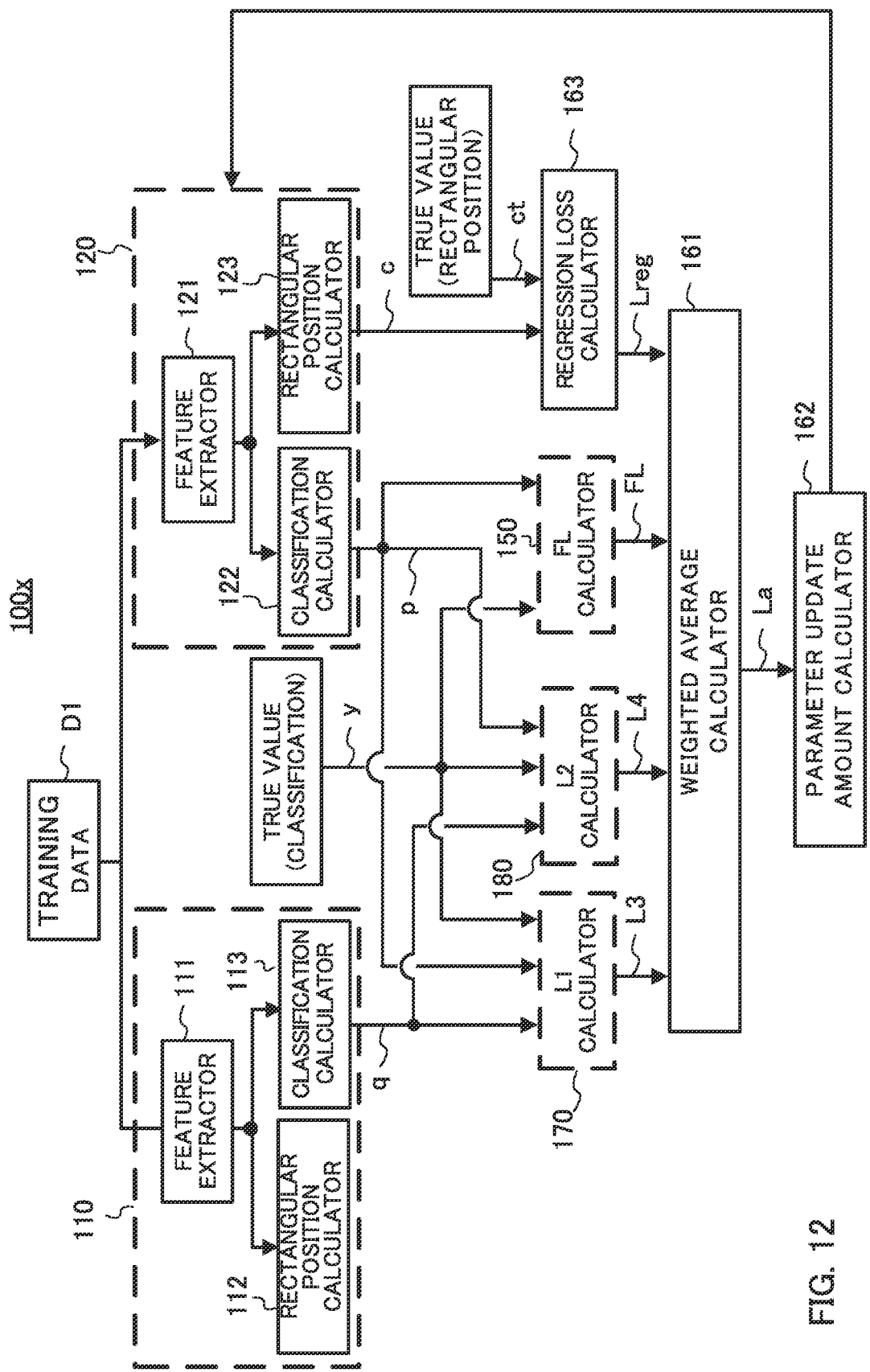
FIG. 12 illustrates an overall functional configuration of the object detection apparatus according to the second example.

Next, an overall configuration of the object detection apparatus 100x will be described. FIG. 12 illustrates the overall functional configuration of the object detection apparatus 100x according to the second example. The object detection apparatus 100x according to the second example is provided with the L3 calculation unit 170 and the L4 calculation unit 180 in place of the L1 calculation unit 130 and the L2 calculation unit 140 in the object detection apparatus 100 of the first example illustrated in FIG. 8, and other elements are the same as those of the object detection apparatus 100 in the first embodiment.

In the object detection apparatus 100x, the weighted average calculator 161 calculates the weighted average of the loss L3, the loss L4, the loss FL, and the regression loss Lreg by using a predetermined weight, and inputs the weighted average as the loss La to the parameter update amount calculator 162. This loss La corresponds to the total loss L represented by the equation (10). The parameter update amount calculator 162 updates the parameters of the student model 120 so that the loss La is reduced. By these processes, the learning of the object detection model is performed.

Second Example Embodiment

Figure 13:
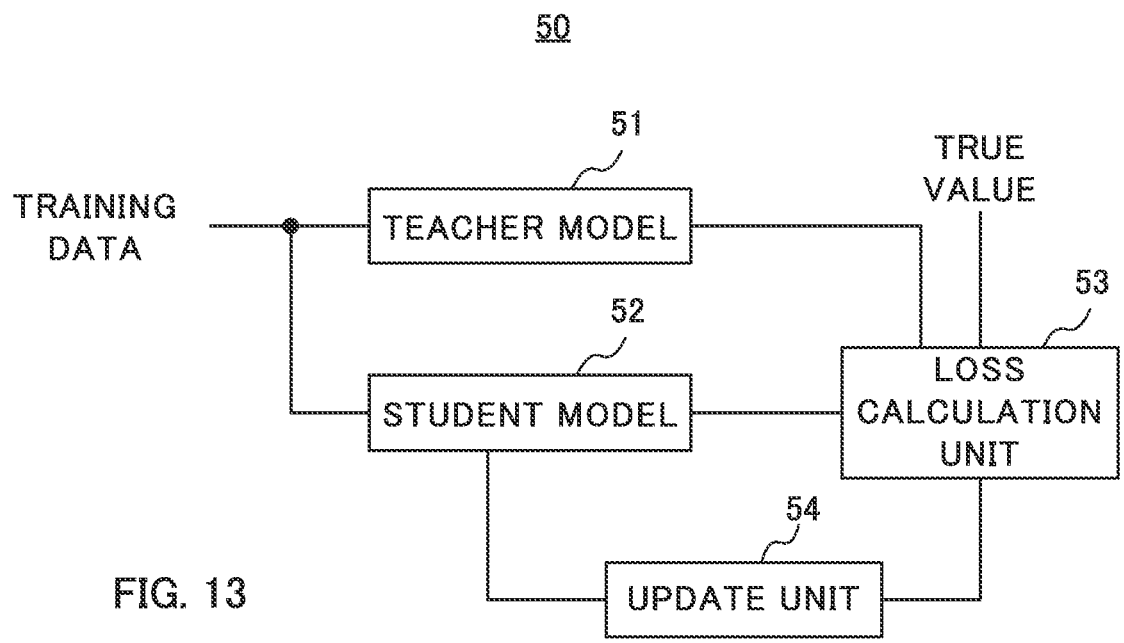
FIG. 13 illustrates a functional configuration of a learning apparatus according to a second example embodiment.

Next, a second example embodiment will be described. FIG. 13 illustrates a functional configuration of a learning apparatus according to the second example embodiment of the present disclosure. A hardware configuration of a learning apparatus 50 is basically the same as that in FIG. 3.

As illustrated, the learning apparatus 50 includes a teacher model 51, a student model 52, a loss calculation unit 53, and an update unit 54. The teacher model 51 outputs an inference result for input training data to the loss calculation unit 53. The student model 52 outputs the inference result for the input training data to the loss calculation unit 53. The loss calculation unit 53 calculates the total loss based on the output of the teacher model 51, the output of the student model 52, and a true value for the training data.

Here, the loss calculation unit 53 calculates a total loss using at least one of the following (1) to (3).

(1) a first loss obtained by multiplying a difference between the true value and an output of the student model 52 by a first weight that increases as a level of confidence of an output of the teacher model 51 is lower.

(2) a second loss obtained by multiplying the difference between the true value and the output of the student model 52 by a second weight that increases as a difference between the true value and the output of the teacher model 51 increases.

(3) a third loss obtained by multiplying a third weight that increases as a difference between the output of the teacher model 51 and the output of the student model 52 increases, and a fourth weight that increases as the difference between the true value and the output of the teacher model 51 increases by a difference between the output of the teacher model 51 and the output of the student model 52. Accordingly, the update unit 54 updates the parameters of the student model 52 based on the total loss.

Figure 14:
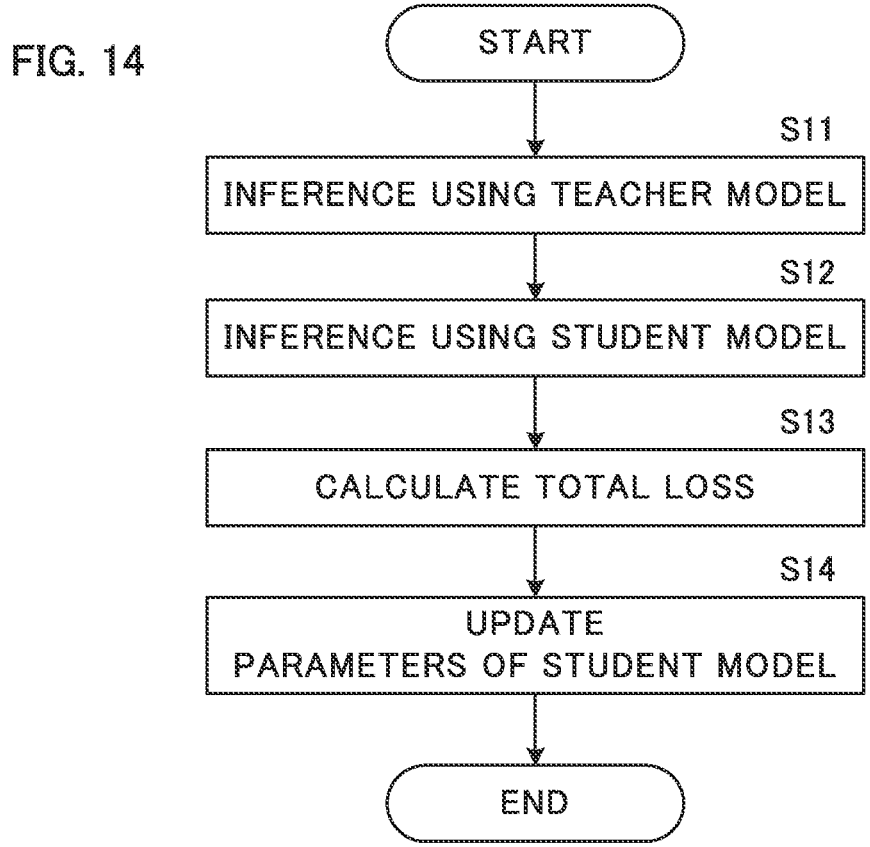
FIG. 14 is a flowchart of a learning process the second example embodiment.

FIG. 14 is a flowchart of a learning process by the learning apparatus 50. When training data and a true value for the training data are input, the teacher model 51 infers from the training data and outputs an inference result (step S11). Next, the student model 52 infers from the training data and outputs an inference result (step S12). Subsequently, the loss calculation unit 53 calculates the total loss using at least one of the first loss to the third loss by the above method (step S13). Consequently, the update unit 54 updates parameters of the student model 52 based on the total loss (step S14).

Modification Example

In the above example embodiment, the KL distance is used as each distance among a teacher model output, a student model output, and a true value. In this case, the KL distance between the teacher model output q and the student model output p is given by the following equation.

[Math 17]

$$KL(q\|p) = q\log[q] - q\log[p] + (1-q)\log[1-q] - (1-q)\log[1-p] \quad (17)$$

Instead of this equation, the Euclidean distance (also referred to as a "L2 norm") shown below may be used.

[Math 18]

$$L2\text{norm} = \sqrt{(q-p)^2} \quad (18)$$

A part or all of the example embodiments described above may also be described as the following supplementary notes, but not limited thereto.

(Supplementary Note 1)

1. A learning apparatus comprising:
   a teacher model configured to output an inference result with respect to training data;
   a student model configured to output an inference result with respect to the training data;
   a loss calculation unit configured to calculate a total loss based on an output of the teacher model, an output of the student model, and a true value with respect to the training data; and
   an update unit configured to update parameters of the student model based on the total loss,
   wherein the loss calculation unit calculates the total loss using at least one of
   (1) a first loss obtained by multiplying a difference between the true value and the output of the student model by a first weight that increases as a level of confidence of the output of the teacher model is lower,
   (2) a second loss obtained by multiplying a difference between the true value and the output of the student model by a second weight that increases as a difference between the true value and the output of the teacher model is greater, and
   (3) a third loss obtained by multiplying a difference between the output of the teacher model and the output of the student model by a third weight that increases as the difference between the output of the teacher model and the output of the student model is greater and a fourth weight that increases as the difference between the output of the teacher model and the output of the student model is smaller.

(Supplementary Note 2)

2. The learning apparatus according to supplementary note 1, wherein the loss calculation unit includes a distance calculator configured to calculate, as distances, the difference between the true value and the output of the student model, the difference between the true value and the output of the teacher model, and the difference between the output of the teacher model and the output of the student model.

(Supplementary Note 3)

3. The learning apparatus according to supplementary note 1 or 2, wherein the loss calculation unit calculates the level of confidence by an entropy function.

(Supplementary Note 4)

4. The learning apparatus according to supplementary notes 1 through 3, wherein the loss calculation unit calculates the total loss by a weighted average of two or more losses from among the first loss, the second loss, and the third loss.

(Supplementary Note 5)

5. The learning apparatus according to supplementary notes 1 through 4, wherein
   the training data are image data,
   the learning apparatus further comprises a feature extraction unit configured to generate a feature map by extracting features from the image data, and
   the teacher model and the student model output the inference results for each anchor determined to the feature map.

(Supplementary Note 6)

6. The learning apparatus according to supplementary note 5, wherein each of the teacher model and the student model performs a class classification with respect to target objects included in the image data based on the feature map extracted by the feature extraction unit.

(Supplementary Note 7)

7. The learning apparatus according to supplementary note 6, wherein each of the teacher model and the student model performs each position of the target objects included in the image data based on the feature map extracted by the feature extraction unit.

(Supplementary Note 8)

8. A learning method, comprising:
outputting an inference result with respect to training data by a teacher model;
outputting an inference result with respect to the training data by a student model;
calculating a total loss based on an output of the teacher model, an output of the student model, and a true value with respect to the training data by using at least one of
(1) a first loss obtained by multiplying a difference between the true value and the output of the student model by a first weight that increases as a level of confidence of the output of the teacher model is lower,
(2) a second loss obtained by multiplying a difference between the true value and the output of the student model by a second weight that increases as a difference between the true value and the output of the teacher model is greater, and
(3) a third loss obtained by multiplying a difference between the output of the teacher model and the output of the student model by a third weight that increases as the difference between the output of the teacher model and the output of the student model is greater and a fourth weight that increases as the difference between the output of the teacher model and the output of the student model is smaller.

(Supplementary Note 9)

9. A recording medium storing a program, the program causing a computer to perform a process comprising:
outputting an inference result with respect to training data by a teacher model;
outputting an inference result with respect to the training data by a student model;
calculating a total loss based on an output of the teacher model, an output of the student model, and a true value with respect to the training data by using at least one of
(1) a first loss obtained by multiplying a difference between the true value and the output of the student model by a first weight that increases as a level of confidence of the output of the teacher model is lower,
(2) a second loss obtained by multiplying a difference between the true value and the output of the student model by a second weight that increases as a difference between the true value and the output of the teacher model is greater, and
(3) a third loss obtained by multiplying a difference between the output of the teacher model and the output of the student model by a third weight that increases as the difference between the output of the teacher model and the output of the student model is greater and a fourth weight that increases as the difference between the output of the teacher model and the output of the student model is smaller.

While the disclosure has been described with reference to the example embodiments and examples, the disclosure is not limited to the above example embodiments and examples. It will be understood by those of ordinary skill in the art that various changes in form and details may be made therein without departing from the spirit and scope of the present disclosure as defined by the claims.

DESCRIPTION OF SYMBOLS

50 Learning apparatus
100, 100x Object detection apparatus
110 Teacher model
120 Student model
130 L1 calculation unit
140 L2 calculation unit
150 FL calculation unit
170 L3 calculation unit
180 L4 calculation unit
161 Weighted average calculator
162 Parameter update amount calculator

What is claimed is:

1. A learning apparatus comprising:
a memory storing instructions; and
one or more processors configured to execute the instructions to:
perform as a teacher model configured to output an inference result with respect to training data;
perform as a student model configured to output an inference result with respect to the training data;
calculate a total loss based on an output of the teacher model, an output of the student model, and a true value with respect to the training data; and
update parameters of the student model based on the total loss,
wherein the processor calculates the total loss using at least one of
(1) a first loss obtained by multiplying a difference between the true value and the output of the student model by a first weight that increases as a level of confidence of the output of the teacher model is lower,
(2) a second loss obtained by multiplying a difference between the true value and the output of the student model by a second weight that increases as a difference between the true value and the output of the teacher model is greater, and
(3) a third loss obtained by multiplying a difference between the output of the teacher model and the output of the student model by a third weight that increases as the difference between the output of the teacher model and the output of the student model is greater and a fourth weight that increases as the difference between the output of the teacher model and the output of the student model is smaller,
wherein the processor calculates the total loss by a weighted average of two or more losses from among the first loss, the second loss, and the third loss.

2. The learning apparatus according to claim 1, wherein the processor includes a distance calculator configured to calculate, as distances, the difference between the true value and the output of the student model, the difference between the true value and the output of the teacher model, and the difference between the output of the teacher model and the output of the student model.

3. The learning apparatus according to claim 1, wherein the processor calculates the level of confidence by an entropy function.

4. The learning apparatus according to claim 1, wherein the training data are image data,
the processor generates a feature map by extracting features from the image data, and
the teacher model and the student model output the inference results for each anchor determined to the feature map.

5. The learning apparatus according to claim 4, wherein each of the teacher model and the student model performs a class classification with respect to target objects included in the image data based on the extracted feature map.

6. The learning apparatus according to claim 5, wherein each of the teacher model and the student model performs each position of the target objects included in the image data based on the extracted feature map.

7. A learning method, comprising:
outputting an inference result with respect to training data by a teacher model;
outputting an inference result with respect to the training data by a student model;
calculating a total loss based on an output of the teacher model, an output of the student model, and a true value with respect to the training data by using at least one of
(1) a first loss obtained by multiplying a difference between the true value and the output of the student model by a first weight that increases as a level of confidence of the output of the teacher model is lower,
(2) a second loss obtained by multiplying a difference between the true value and the output of the student model by a second weight that increases as a difference between the true value and the output of the teacher model is greater, and
(3) a third loss obtained by multiplying a difference between the output of the teacher model and the output of the student model by a third weight that increases as the difference between the output of the teacher model and the output of the student model is greater and a fourth weight that increases as the difference between the output of the teacher model and the output of the student model is smaller,
wherein the calculating the total loss further comprises calculating the total loss by a weighted average of two or more losses from among the first loss, the second loss, and the third loss.

8. A non-transitory computer-readable recording medium storing a program, the program causing a computer to perform a process comprising:
outputting an inference result with respect to training data by a teacher model;
outputting an inference result with respect to the training data by a student model;
calculating a total loss based on an output of the teacher model, an output of the student model, and a true value with respect to the training data by using at least one of
(1) a first loss obtained by multiplying a difference between the true value and the output of the student model by a first weight that increases as a level of confidence of the output of the teacher model is lower,
(2) a second loss obtained by multiplying a difference between the true value and the output of the student model by a second weight that increases as a difference between the true value and the output of the teacher model is greater, and
(3) a third loss obtained by multiplying a difference between the output of the teacher model and the output of the student model by a third weight that increases as the difference between the output of the teacher model and the output of the student model is greater and a fourth weight that increases as the difference between the output of the teacher model and the output of the student model is smaller,
wherein the calculating the total loss further comprises calculating the total loss by a weighted average of two or more losses from among the first loss, the second loss, and the third loss.

* * * * *